(12) United States Patent
Ardavanis et al.

(10) Patent No.: US 10,281,059 B2
(45) Date of Patent: May 7, 2019

(54) FIELD JOINT TRANSFER SYSTEM

(71) Applicant: Petrofac Services Ltd., London (GB)

(72) Inventors: Kimon Tullio Ardavanis, Sharjah (AE); Laurent Daney, Dubai (AE)

(73) Assignee: Shanghai Zhenhua Heavy Industries Co., Ltd., Shanghai (CN)

( * ) Notice: Subject to any disclaimer, the term of this patent is extended or adjusted under 35 U.S.C. 154(b) by 0 days.

(21) Appl. No.: 15/742,529

(22) PCT Filed: Jul. 6, 2016

(86) PCT No.: PCT/EP2016/066047
§ 371 (c)(1),
(2) Date: Jan. 8, 2018

(87) PCT Pub. No.: WO2017/005821
PCT Pub. Date: Jan. 12, 2017

(65) Prior Publication Data
US 2018/0195643 A1    Jul. 12, 2018

(30) Foreign Application Priority Data

Jul. 6, 2015    (GB) .................................. 1511775.7

(51) Int. Cl.
| | |
|---|---|
| *F16L 1/235* | (2006.01) |
| *F16L 1/20* | (2006.01) |
| *F16L 1/18* | (2006.01) |
| *B63B 35/03* | (2006.01) |
| *F16L 1/225* | (2006.01) |
| *F16L 1/23* | (2006.01) |

(52) U.S. Cl.
CPC .............. *F16L 1/207* (2013.01); *B63B 35/03* (2013.01); *F16L 1/18* (2013.01); *F16L 1/206* (2013.01); *F16L 1/225* (2013.01); *F16L 1/23* (2013.01); *F16L 1/235* (2013.01); *B63B 2734/00* (2013.01)

(58) Field of Classification Search
CPC . F16L 1/206; F16L 1/207; F16L 1/225; F16L 1/23; F16L 1/235
See application file for complete search history.

(56) References Cited

U.S. PATENT DOCUMENTS

| | | | | |
|---|---|---|---|---|
| 3,658,222 A | * | 4/1972 | Dressel | ..................... F16L 1/23 226/108 |
| 4,062,456 A | | 12/1977 | Birdwell | |
| 5,533,834 A | * | 7/1996 | Recalde | ................. F16L 1/202 405/166 |

(Continued)

*Primary Examiner* — Frederick L Lagman
(74) *Attorney, Agent, or Firm* — N.V. Nederlandsch Octrooibureau; Catherine A. Shultz; Tamara C. Stegmann

(57) ABSTRACT

A field joint transfer system for transferring a hot field joint along a curved path between a tensioner and a stinger during deployment of a pipeline from a pipelay vessel. The system comprises a plurality of adjustable pipe support units defining a curved path between the tensioner and the stinger, wherein one or more of the pipe support units can be moved out of engagement with the pipeline to allow the hot fieldjoint to pass the respective pipe support unit without contact, while maintaining support for the pipeline along the curved path. A mobile pipe support may be provided on an overhead gantry to follow the pipe as it passes along the curved path.

17 Claims, 4 Drawing Sheets

(56) References Cited

U.S. PATENT DOCUMENTS

| | | | | |
|---|---|---|---|---|
| 5,893,682 A | * | 4/1999 | Oliveri | F16L 1/225 |
| | | | | 405/166 |
| 2013/0084135 A1 | * | 4/2013 | Cruickshank | B63B 35/03 |
| | | | | 405/167 |
| 2013/0170913 A1 | * | 7/2013 | Hoffmann | B29C 45/04 |
| | | | | 405/166 |
| 2014/0044487 A1 | | 2/2014 | van Grieken et al. | |

* cited by examiner

FIELD JOINT TRANSFER SYSTEM

BACKGROUND OF THE INVENTION

1. Field of the Invention

The present invention relates to systems for transferring a field joint, in particular for transfer of a hot field joint that has received a field joint coating during pipelay operations from a vessel. The invention also relates to a method of transferring such a field joint after application of the coating.

2. Description of the Related Art

Pipelay vessels or barges are generally known in various configurations. They may be broadly divided into three main principles of operations, namely J-lay vessels for deep water, near vertical pipe deployment, S-lay vessels for horizontal or low angle deployment and reel lay vessels, where a continuous pipe is unwound from a reel. The present invention is primarily directed to S-lay operation although it is not excluded that its teachings may also be applied to other methods of deployment. Nevertheless, in the following the description is limited to S-lay deployment.

In the case of S-lay deployment, pipe joints are assembled in a horizontal working plane and joined up to the pipeline. Assembly of the pipe joints to the pipeline may involve pre-assembly of singles to form doubles, triples or quads, or each joint may be individually joined to the free end of the pipeline. Assembly takes place on one or more of the decks of the vessel and the section of the deck where the pipeline departs is referred to as the firing line. Here, the pipeline is held by one or more tensioners that let out the pipeline as new joints are added and the vessel moves forwards.

As the pipeline is deployed from the vessel it tends to follow a catenary or similar curve toward the seabed. It is the S-shape of this curve that gives its name to the S-lay type of operation. In order to provide the transition between this curve and the region onboard the vessel, a support structure called an S-lay stinger provides an extension from the stern of the vessel to guide the pipeline up to the point at which it hangs free.

The angle by which the pipeline is deployed from the vessel can be adjusted from horizontal in shallow water to a relatively steep angle for deep-water by adjusting the inclination of the stinger. A curved path is defined between the last tensioner and the stinger. In this region, the pipeline may be supported by a number of pipe support units that are adjustably located beneath the pipeline and may be provided with rollers to guide the pipeline along and around the curved path. It is noted however that the curve of the pipeline may already commence before the last tensioner, which may itself be angled to the horizontal.

As mentioned above, assembly of the pipeline takes place by adding additional joints or strings at the firing line. The pipe joints are generally joined by welding and the process involves a series of steps. These include preparation steps, butt joint welding, inspection of the weld followed by reconstitution of the pipeline anticorrosion or thermal insulation coating. The joint produced is referred to as a field-joint in that it has been produced in the field. The length of the pipe to be welded, inspected and coated, is defined on a project case by case basis depending on the welding, non-destructive testing (NDT) and factory applied coating specification. The thickness of the factory applied coating as well as the thickness of the field-joint coating may be defined by dedicated project specifications.

The reconstitution of the field-joint anti-corrosion protection layers and possibly the thermal application of the butt welded area is called field-joint coating. This is a relatively complex operation that may involve a number of different steps using specialised materials such as epoxies and other polymer layers. To ensure optimum application of the field-joint coating, different application temperatures may be required. The area to which the field-joint coating is applied may also require quenching or controlled cooling prior to supporting any external load or impact on the coating material. As a result of these quenching or curing operations, progress of the pipeline through the tensioners or over the pipe support units may be delayed until the hot field-joint has completed its curing process.

BRIEF SUMMARY OF THE INVENTION

According to the invention there is provided a method of deploying a pipeline from a vessel, the vessel comprising at least one tensioner for controlling the tension of the pipeline between the vessel and the seabed, a stinger over which the pipeline is deployed and a series of adjustable pipe support units defining a curved path between the tensioner and the stinger, the method comprising: applying a hot field-joint coating to a weld region of the pipeline; traversing the curved path with the hot field-joint; moving one or more of the adjustable pipe support units out of the curved path to allow the hot field-joint to pass the respective pipe support unit without contact, while maintaining support for the pipeline along the curved path. As a result of the claimed method, more rapid and continuous deployment of the pipeline may take place, since the field-joint may progress downstream of the tensioner towards the stinger despite the coating being only partially cured.

In the context of the present invention, it will be understood that the vessel may be any form of vessel, including a pipelay vessel, a barge, a semi-submersible or the like. The area downstream of the tensioner where the pipe support units are located may be external of the vessel. In general however, this area will be an area that is at least partially protected from the environment e.g. beneath a deck of the vessel. Furthermore, although reference is given to a stinger, this does not form part of the present invention and this feature may be taken to include any point of departure at which a pipeline last makes contact with the vessel. Of importance is that the pipeline is adequately supported along the curved path and that this support remains adequate, i.e. within the required tolerances for bending moment applied to the pipe even when a support unit is retracted to allow a field joint to pass. It will also be understood that the amount of support will be dependent on the radius of curvature to which the pipeline is being exposed or to the angle through which it is being turned. For a shallow angle of departure, less additional support may be needed than for a steep angle of departure.

In one embodiment of the method, the pipe support units are located at fixed distances along the curved path and a mobile pipe support is provided and is moved together with the pipe along the curved path. The mobile pipe support thus provides additional support as one or more of the pipe support units are retracted.

The method may also comprise use of an overhead gantry extending above the curved path to support the pipeline. The pipeline may be supported at locations adjacent to the hot field-joint e.g. on either side of the field-joint. In such a configuration, the gantry will generally be straight and located a sufficient distance above the pipeline and support units to allow for any chosen curvature of the pipeline. In this case, the mobile pipe support is preferably adjustable in height in order that it can follow the curved path, maintaining support for the pipeline. The method may preferably comprise controlling the height of the mobile pipe support automatically during progress of the pipeline. In this context, it is noticed that although reference is made to progress of the pipeline, this is merely relative to the vessel and it is in fact the vessel that moves forwards as the pipeline remains generally still. The height of the mobile support unit may be adjusted in response to a position of the part of the pipeline being supported e.g. based on a predicted position or a position measured in real time. Alternatively it may be adjusted to maintain or provide a given force on the mobile pipe support due to the pipe. This may be controlled by appropriate dedicated software that includes input related to the realtime position of the pipeline with respect to the vessel and the required curvature at the point of support.

A preferred embodiment of the invention uses a mobile pipe support travelling above the curved path. It is however not excluded that some form of mobile pipe support be provided beneath the curved path or even at the side of the curved path. In one embodiment, one or more of the pipe support units may also be movable along the curved path at least over a distance corresponding to a length of the field-joint coating.

It will also be understood that although reference is given to traversing the curved path with the hot field-joint there is no need that the field-joint remains hot during the whole of the movement and that it merely requires sufficient opportunity for the field-joint to fully cure according to the appropriate specification. For this reason, movement of the first pipe support unit (after the coating operation) out of contact with the field joint is of primary importance. Movement of the other pipe support units may not be required if curing or quenching is complete.

In one embodiment, the field joint coating is applied between the tensioner and a first of the pipe support units and quenching of the coating takes place at least partially after the first of the pipe support units.

According to a further embodiment, the method may comprise automatically moving the pipe support units out of engagement with the pipe and moving them back into engagement once the hot field-joint has passed.

The invention also relates to a field joint transfer system for transferring a hot field joint along a curved path between a tensioner and a stinger during deployment of a pipeline from a pipelay vessel, the system comprising a plurality of adjustable pipe support units defining a curved path between the tensioner and the stinger, wherein one or more of the pipe support units can be moved out of engagement with the pipeline to allow the hot field-joint to pass the respective pipe support unit without contact, while maintaining support for the pipeline along the curved path. The system may be arranged to operate as described above and hereinafter.

In one embodiment, the system may further comprise a mobile pipe support arranged to move with the pipeline along the curved path. Various possibilities may be foreseen to achieve such a mobile pipe support, including cranes, winches, rails, conveyors, rollers and the like. In one embodiment there is provided an overhead gantry extending above the curved path and the mobile pipe support traverses along the gantry to support the pipeline. The mobile pipe support may also comprise a hoist allowing it to be adjustable in height to support the pipeline along the curved path. In a still further embodiment, the mobile pipe support may be mounted on a bridge carried by the gantry such that it can also move laterally across the bridge with respect to the gantry and the pipeline. In this manner, it can also follow lateral movements of the pipeline should this not exit the (stern of) the vessel in a perfectly axial trajectory.

The skilled person will be familiar with numerous ways in which the pipeline may be supported from an overhead gantry including using slings, cables, clamps and the like. In one preferred embodiment the mobile pipe support comprises a sling in which the pipeline rests, which may cradle the pipeline or be wrapped once around it.

According to a further embodiment the system may comprise two mobile pipe supports arranged to traverse on the gantry and being engageable with the pipeline on either side of the field-joint being supported. The skilled person will be well aware that further mobile pipe supports may be provided to support at intervals along the pipeline and that the mobile pipe supports may be moveable together or independently. At the least, they should be independently adjustable in height.

In principle, the invention is applicable to installations of any scale but it is particularly applicable to large pipelay vessels where efficient operation is of great importance. The system may have at least three pipe support units along the curved path. The curved path may also have a length of at least 18 meters. For typical pipe sections of 12 meters, this represents one and a half pipe sections. It will be understood that for a firing line operational to pre-assemble doubles, triples and quads, including completion of the field joint coating upstream of the tensioner, not every field joint will have to be coated downstream of the tensioner.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
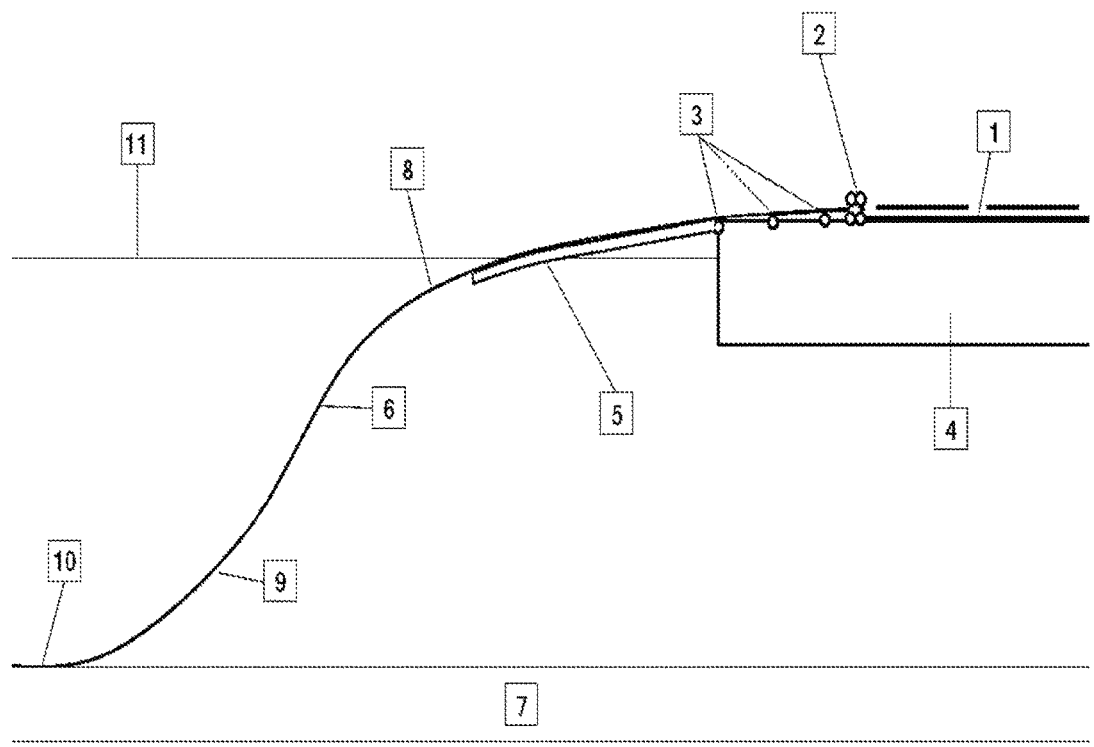
FIG. 1 shows a side elevation of part of a vessel operating in S-lay configuration.

FIG. 1 shows a side elevation of part of a vessel 4 operating in S-lay configuration to deploy a pipeline 6 over a stinger 5. On board the vessel 4, the pipeline 6 is assembled in a main firing line 1 from single joints by butt welding the joints together as is generally conventional and will not be further described here. The pipeline 6 is lowered through tensioners 2 and over pipe support units 3 and stinger 5 to the seabed 7. The tension applied by the tensioners 2 determines the curvature of the lower section (sagbend) 9 of the pipeline 6, while the angle of the stinger 5 determines the curvature of the upper section (overbend) 8.

Figure 2:
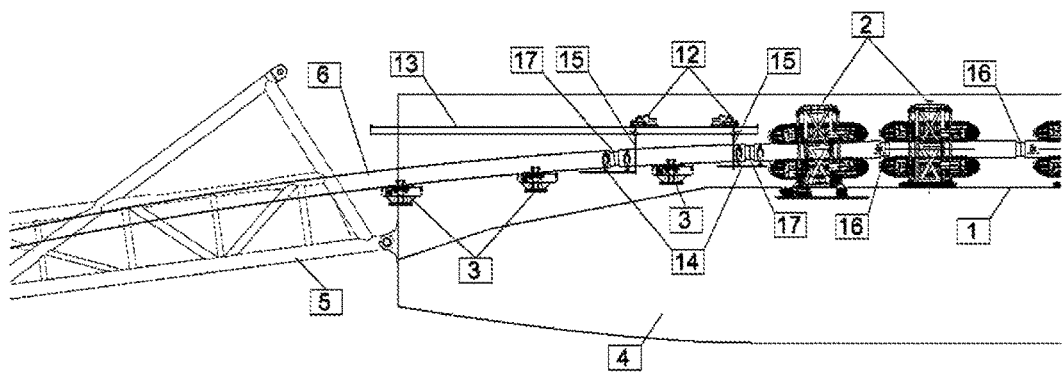
FIG. 2 shows a stern starboard side elevation of the vessel during application of the hot field-joint.

FIG. 2 shows a stern starboard side elevation of the vessel 4 in greater detail illustrating the tensioners 2, the pipe support units 3 and the stinger 5. In the illustrated embodiment, three pipe support units 3 are shown although it will be understood that this number may vary according to the length of the curved path that the pipeline 6 must span between the last tensioner 2 and the stinger 5. Between the last tensioner 2 and the first pipe support unit 3 there is located a field-joint coating station 14. A second field joint coating station 14 is located between the first and second pipe support units 3. A butt weld 16 after passing through the last tensioner 2 enters the field joint coating station and a field-joint coating 17 is applied to restore the anticorrosion protective layers and any other layers required by the pipeline 6. Also shown in FIG. 2 is an overhead gantry 13 on which traverses a pair of mobile pipe supports 12 including slings 15, which engage beneath the pipeline 6 close to the field joint coating 17.

Operation of the invention will now be described with reference to FIGS. 3 to 6, which show stern starboard side elevations of the vessel of FIG. 2 during various stages of deployment of the pipeline.

Figure 3:
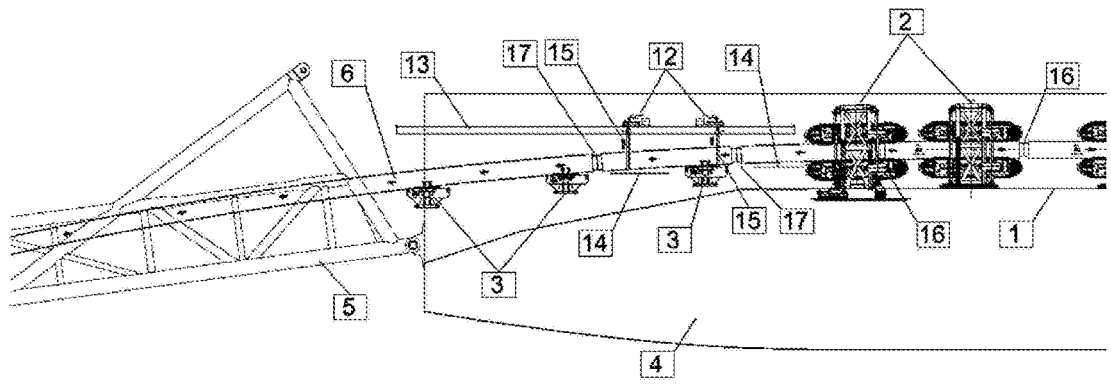
FIGS. 3 to 6 show stern starboard side elevations of the vessel of FIG. 2 during deployment of the pipeline.

According to FIG. 3, the pipeline 6 has advanced by about half of a pipe joint length (around 6 m) to a point where the still hot field joint coating 17 has approached the pipe support unit 3. In fact, the pipeline 6 has moved rearwards while the vessel 4 has advanced. During this movement, the mobile pipe supports 12 have moved along the gantry 13 supporting partially the weight of the pipeline. Overall operation of the system is controlled by suitable software that monitors the pipelay operation. This software receives real-time input information on pipeline motion including the pipeline laying speed and status of the pipe support units 3 with respect to the position of the hot field-joint coating 17. Additional information received in real-time is the pipeline curvature of the upper section 8. The system software adjusts in real-time the reaction applied from the pipe support units 3 located below the pipeline 6 and the force applied by the mobile pipe supports 12 in order to ensure the same reaction on the pipeline 6 over the curved path.

Figure 4:
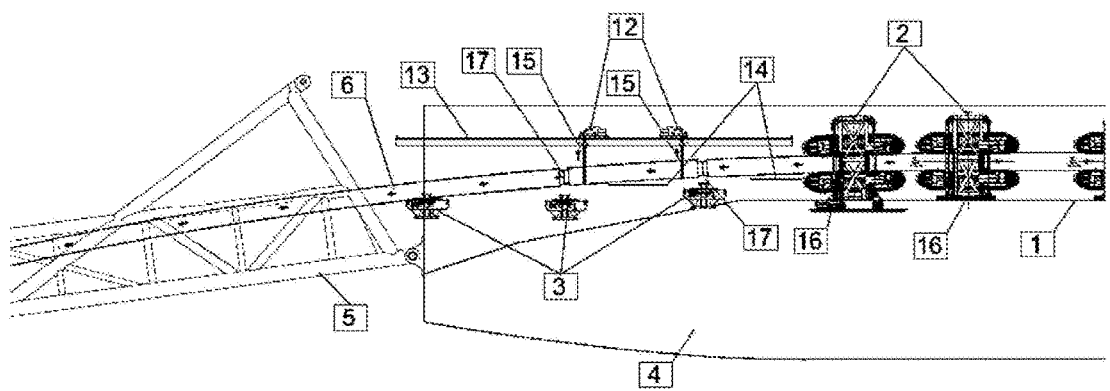

In FIG. 4, the first two pipe support units 3 have been moved downwards under the control of the system software, out of contact with the pipeline 6. The weight of the pipeline 6 at this location is now supported by the slings 15 of the mobile pipe supports 12. The still hot and not fully cured field-joint coatings 17 can pass through the pipe support units 3 without the field-joint coating 17 becoming damaged.

Figure 5:
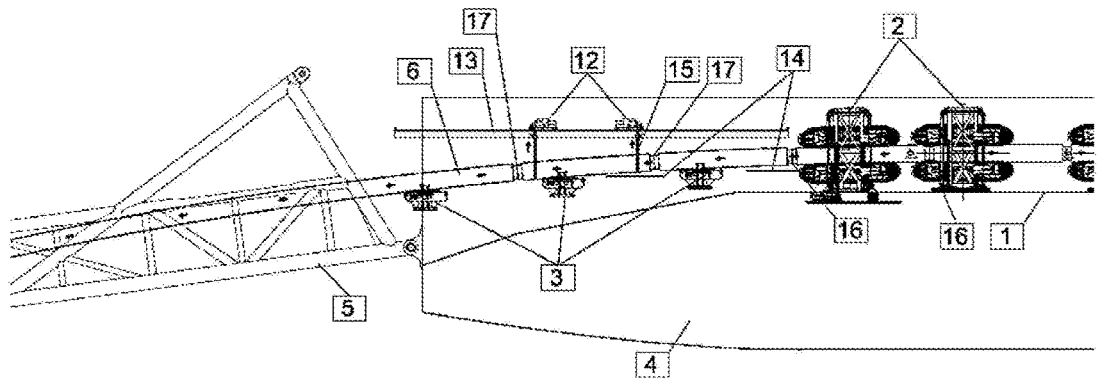

In FIG. 5, the pipeline 6 has advanced to a position where the field-joint coatings 17 have passed through the pipe support units 3 and the pipe support units 3 have again been raised to take the weight of the pipeline 6. Simultaneously, the system software has reduced the force applied by the mobile pipe supports 12 through the slings 15.

Figure 6:
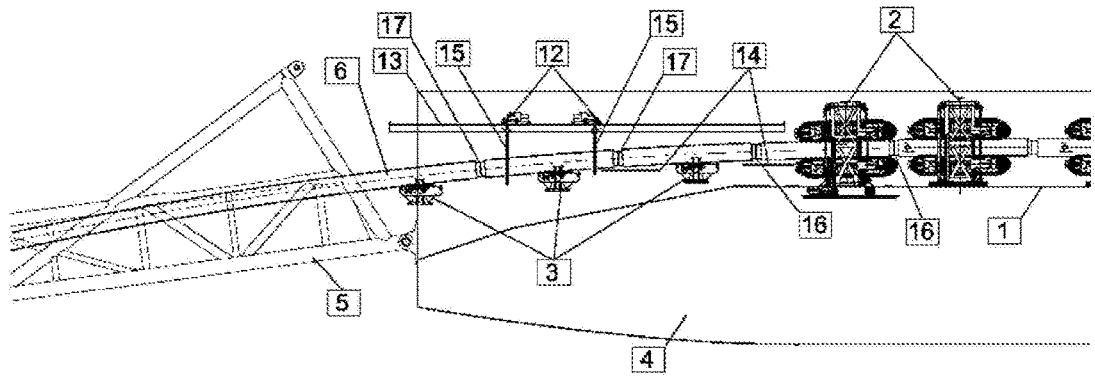

FIG. 6 shows a similar view to FIG. 5, in which the slings 15 have been released whereby the mobile pipe supports 12 may be returned to their starting position. This may take place either manually or automatically.

Figure 7:
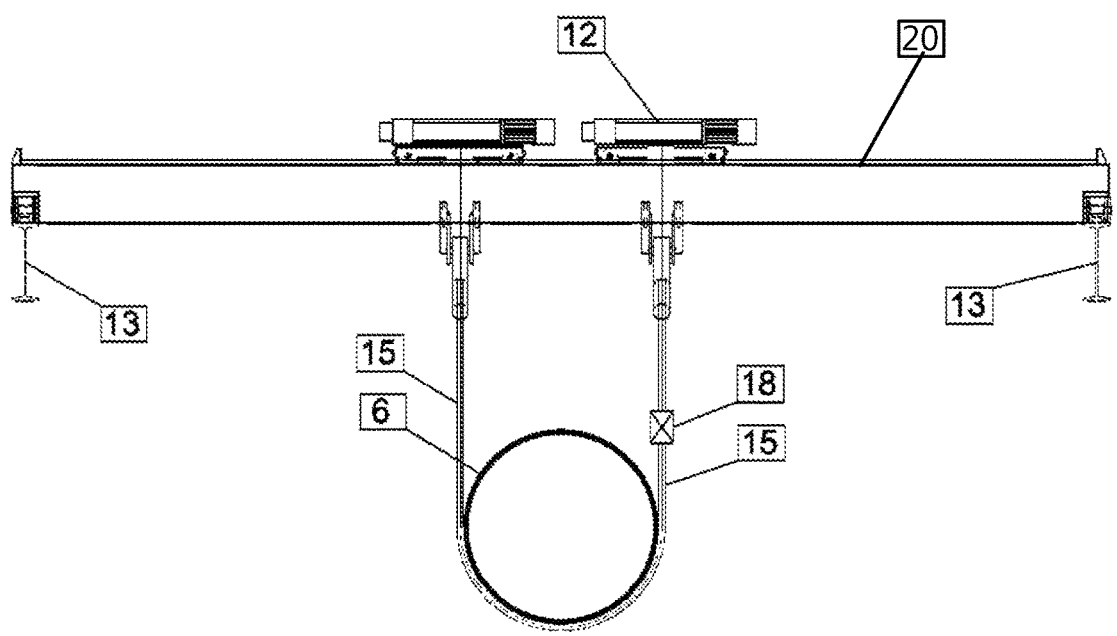
FIG. 7 shows a stern view of a mobile pipe support.

FIG. 7 shows a stern view of a mobile pipe support 12 showing its support from the gantry 13, which comprises a pair of rails aligned with the fore and aft direction of the vessel 4 and with the pipeline 6. It will be understood that alternative systems using a single rail could also be envisaged. A bridge 20 is mounted on the gantry 13 and is moveable along the gantry rails. The mobile pipe support 12 is mounted to traverse laterally on the bridge 20 such that it can accommodate lateral movement of the pipeline 6. The sling 15 is suspended from mobile pipe support 12, which is embodied as a winch such that the sling 15 can be shortened and lengthened as required during movement of the pipeline 6. Also shown in FIG. 7 is a quick-release system 18 which allows automatic opening of the sling 15 and release of the pipeline 6 once the field-joint coating 17 has passed the pipe support units 3 to the position of FIG. 6.

Thus, the invention has been described by reference to certain embodiments discussed above. It will be recognized that these embodiments are susceptible to various modifications and alternative forms well known to those of skill in the art. In particular, although a gantry system for supporting the pipeline has been shown it will be understood that other systems achieving the same result may also be used. Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A method of deploying a pipeline from a vessel, the vessel comprising at least one tensioner for controlling the tension of the pipeline between the vessel and the seabed, a stinger over which the pipeline is deployed and a series of adjustable pipe support units defining a curved path between the tensioner and the stinger wherein the adjustable pipe support units are located at fixed distances along the curved path, the method comprising:
applying a hot field-joint coating to a weld region of the pipeline;
traversing the curved path with the hot field-joint;
moving one or more of the adjustable pipe support units out of the curved path to allow the hot field-joint to pass the respective pipe support unit without contact, and wherein a mobile pipe support is provided and is moved with the pipeline, thus maintaining support for the pipeline along the curved path.

2. The method according to claim 1, wherein the mobile pipe support comprises an overhead gantry extending above the curved path and the method comprises supporting the pipe from the gantry adjacent to the hot field joint.

3. The method according to claim 2, wherein the mobile pipe support is adjustable in height to follow the curved path and the method comprises controlling the height automatically in response to a position of the pipe or a force on the mobile pipe support due to the pipe.

4. The method according to claim 1, wherein one or more of the pipe support units are movable along the curved path.

5. The method of claim 1, wherein the field joint coating is applied between the tensioner and a first of the pipe support units and quenching of the coating takes place at least partially after the first of the pipe support units.

6. The method of claim 1, comprising automatically moving the pipe support units out of engagement with the pipe and moving them back into engagement once the hot field joint has passed.

7. A field joint transfer system for transferring a hot field joint along a curved path between a tensioner and a stinger during deployment of a pipeline from a pipelay vessel, the system comprising a plurality of adjustable pipe support units defining a curved path between the tensioner and the stinger, wherein one or more of the pipe support units can be moved out of engagement with the pipeline to allow the hot field-joint to pass the respective pipe support unit without contact, further comprising a mobile pipe support arranged to move with the pipeline while maintaining support for the pipeline along the curved path.

8. The system according to claim 7, further comprising an overhead gantry extending above the curved path and the mobile pipe support traverses along the gantry to support the pipeline.

9. The system according to claim 8, wherein the mobile pipe support comprises a hoist and is adjustable in height to support the pipeline along the curved path.

10. The system according to claim 8, wherein the mobile pipe support is mounted on a bridge carried by the gantry and can move laterally across the bridge with respect to the gantry and the pipeline.

11. The system according to claim 8, wherein the mobile pipe support comprises a sling in which the pipeline rests.

12. The system according to claim 8, comprising two mobile pipe supports arranged to traverse on the gantry and being engageable with the pipeline on either side of the hot field-joint.

13. The system according to claim 7, comprising at least three pipe support units and wherein the curved path has a length of at least 18 meters.

14. The system according to claim 7, wherein the mobile pipe support is adjustable in height to follow the curved path and the system further comprises a controller adapted to control the height automatically in response to a position of the pipe or a force on the mobile pipe support due to the pipe.

15. A pipelay vessel comprising a stinger for deployment of a pipeline from the vessel a tensioner located onboard the vessel for controlling tension in the pipeline and a field joint coating station located between the tensioner and the stinger for applying a field joint coating to a field joint on the pipeline, whereby the pipeline follows a curved path from the tensioner to the stinger during deployment of the pipeline from the vessel, the vessel further comprising a field joint transfer system comprising a plurality of adjustable pipe support units arranged along the curved path between the tensioner and the stinger, wherein one or more of the adjustable pipe support units can be moved out of engagement with the pipeline to allow a field-joint to pass the respective pipe support unit without contact with the field joint coating, further comprising a mobile pipe support arranged to move with the pipeline in a direction of deployment in order to maintain support for the pipeline along the curved path.

16. The vessel according to claim 15, further comprising an overhead gantry extending above the curved path and the mobile pipe support is arranged to traverse along the gantry and comprises a hoist, adjustable in height to support the pipeline along the curved path.

17. The vessel according to claim 15, wherein the mobile pipe support is adjustable in height to follow the curved path and the field joint transfer system further comprises a controller adapted to control the height automatically in response to a position of the pipe or a force on the mobile pipe support due to the pipe.

* * * * *